United States Patent
Chen et al.

(10) Patent No.: US 9,818,371 B2
(45) Date of Patent: Nov. 14, 2017

(54) METHOD OF CORRECTING COMPLEXION COLOR SHIFT OF LCD AND A SYSTEM THEREOF

(71) Applicant: Shenzhen China Star Optoelectronics Technology Co., Ltd., Shenzhen, Guangdong (CN)

(72) Inventors: Lixuan Chen, Guangdong (CN); Chih-tsung Kang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 126 days.

(21) Appl. No.: 14/423,112

(22) PCT Filed: Jan. 7, 2015

(86) PCT No.: PCT/CN2015/070297
§ 371 (c)(1),
(2) Date: Feb. 21, 2015

(87) PCT Pub. No.: WO2016/082313
PCT Pub. Date: Jun. 2, 2016

(65) Prior Publication Data
US 2016/0155415 A1 Jun. 2, 2016

(30) Foreign Application Priority Data
Nov. 27, 2014 (CN) .......................... 2014 1 0707872

(51) Int. Cl.
*G09G 5/02* (2006.01)
*H04N 9/69* (2006.01)
*G09G 3/36* (2006.01)

(52) U.S. Cl.
CPC ............. *G09G 5/02* (2013.01); *G09G 3/3611* (2013.01); *H04N 9/69* (2013.01);
(Continued)

(58) Field of Classification Search
None
See application file for complete search history.

(56) References Cited

U.S. PATENT DOCUMENTS

2006/0077199 A1* 4/2006 Liao ..................... G09G 3/2007
345/211
2006/0164518 A1* 7/2006 Nakami ................... H04N 1/62
348/222.1
(Continued)

*Primary Examiner* — Yingchun He
(74) *Attorney, Agent, or Firm* — Andrew C. Cheng

(57) ABSTRACT

The present invention discloses a method of correcting complexion color shift of LCD including obtaining accounting ratio of a complexion region of an image which will be shown in the LCD; comparing the accounting ratio of a complexion region to a predetermined value; and applying a first gamma value to conduct gamma correction of the data of red color, green color, and blue color if the accounting ratio is larger than the predetermined value; wherein the first gamma value is larger than 2.2. The present invention also discloses a system of correcting complexion color shift of LCD. The gamma value of front viewing angle of the LCD is increased. Accordingly, the gamma value of the image of big viewing angle approaches the curve of gamma value 2.2 more in the LCD and wash out of the complexion of the image of big viewing angle is eliminated.

4 Claims, 2 Drawing Sheets

(52) U.S. Cl.
CPC ............... *G09G 2320/0285* (2013.01); *G09G 2320/0673* (2013.01); *G09G 2360/16* (2013.01)

(56) References Cited

U.S. PATENT DOCUMENTS

| | | | |
|---|---|---|---|
| 2010/0156774 A1* | 6/2010 | Broughton | G09G 3/2018 345/88 |
| 2010/0160049 A1* | 6/2010 | Oku | A63F 13/655 463/43 |
| 2011/0134328 A1* | 6/2011 | Tomioka | G06T 1/00 348/652 |

* cited by examiner

METHOD OF CORRECTING COMPLEXION COLOR SHIFT OF LCD AND A SYSTEM THEREOF

BACKGROUND

Technical Field

The present invention relates to a liquid crystal display (LCD), and more particularly, to a method of correcting complexion color shift of LCD and a system thereof.

Description of the Related Art

With the evolution of optoelectronics and semiconductor, flat panel displays flourish, wherein a liquid crystal display (LCD) has become the mainstream of the market because of its great space utilization, low power consumption, non-radiation, and low electromagnetic interference. Vertical alignment (VA) displaying mode is popular because of its great viewing angle characteristics among various displaying modes of the LCD. In the LCD of VA displaying mode, the long axis of the liquid crystal (LC) molecule in the pixel unit is perpendicular to the filter without power. Each pixel unit is divided into multiple domains and the LC molecules in each domain are deflected under power. In this way, the orientations of the LC molecules in the same pixel are divided into multiple directions and the viewing angle can be compensated in various angles. As the result, the uniform displaying in various directions of the viewing angles is realized to effectively improve the viewing angle characteristics in grayscale. The gamma value of the image of the big viewing angle usually deviates the curve of gamma value 2.2 in the LCD of VA displaying mode so the complexion of the image of the big viewing angle is washed out.

SUMMARY OF THE DISCLOSURE

For solving the above problem, the present invention is to provide a method of correcting complexion color shift of LCD including obtaining accounting ratio of a complexion region of an image which will be shown in the LCD; comparing the accounting ratio of a complexion region to a predetermined value; and applying a first gamma value to conduct gamma correction of the data of red color, green color, and blue color if the accounting ratio is larger than the predetermined value; wherein the first gamma value is larger than 2.2.

In addition, the method includes applying a second gamma value to conduct gamma correction of the data of red color, green color, and blue color if the accounting ratio is not larger than the predetermined value; wherein the second gamma value is less than the first gamma value.

Furthermore, a method of obtaining the accounting ratio of the complexion region includes obtaining amount of pixel of the complexion region; obtaining amount of pixel of the image; and dividing the amount of pixel of the complexion region by the amount of pixel of the image.

Moreover, the range of the predetermined value is 0.1~0.2.

Moreover, the first gamma value is larger than or equal to 2.4.

Another purpose of the present invention is to provide a system of correcting complexion color shift of LCD including an accounting ratio of a complexion region obtaining unit configured to obtain accounting ratio of a complexion region of an image which will be shown in the LCD; a compare unit configured to compare the accounting ratio of the complexion region to a predetermined value; a first lookup table unit configured to apply a first gamma value to conduct gamma correction of the data of red color, green color, and blue color if the accounting ratio is larger than the predetermined value; wherein the first gamma value is larger than 2.2.

In addition, the system includes a second lookup table unit configured to apply a second gamma value to conduct gamma correction of the data of red color, green color, and blue color if the accounting ratio is not larger than the predetermined value; wherein the second gamma value is less than the first gamma value.

Furthermore, the accounting ratio of a complexion region obtaining unit includes a first pixel-obtaining unit configured to obtain amount of pixel of the complexion region; a second pixel-obtaining unit configured to obtain amount of pixel of the image; and a computer unit configured to divide the amount of pixel of the complexion region by the amount of pixel of the image.

Moreover, the range of the predetermined value is 0.1~0.2.

Moreover, the first gamma value is larger than or equal to 2.4.

The advantage of the present invention is that a gamma value conducting gamma correction of data of red color, green color, and blue color of an image which will be shown in the LCD is increased as accounting ratio of a complexion region of the image is larger than a predetermined value. That is, the gamma value of the image of front viewing angle of the LCD is increased. Accordingly, the gamma value of the image of big viewing angle approaches the curve of gamma value 2.2 more in the LCD and wash out of the complexion of the image of the big viewing angle is eliminated.

BRIEF DESCRIPTION OF THE DRAWINGS

The accompanying drawings are included to provide easy understanding of the application, are incorporated herein and constitute a part of this specification. The drawings illustrate embodiments of the application and, together with the description, serve to illustrate the principles of the application.

DESCRIPTION OF THE PREFERRED EMBODIMENTS

To better and concisely explain the disclosure, the same name or the same reference number given or appeared in different paragraphs or figures along the specification should has the same or equivalent meanings while it is once defined anywhere of the disclosure.

The following shows the description of the embodiments of the present disclosure in accordance with the drawings.

Figure 1:
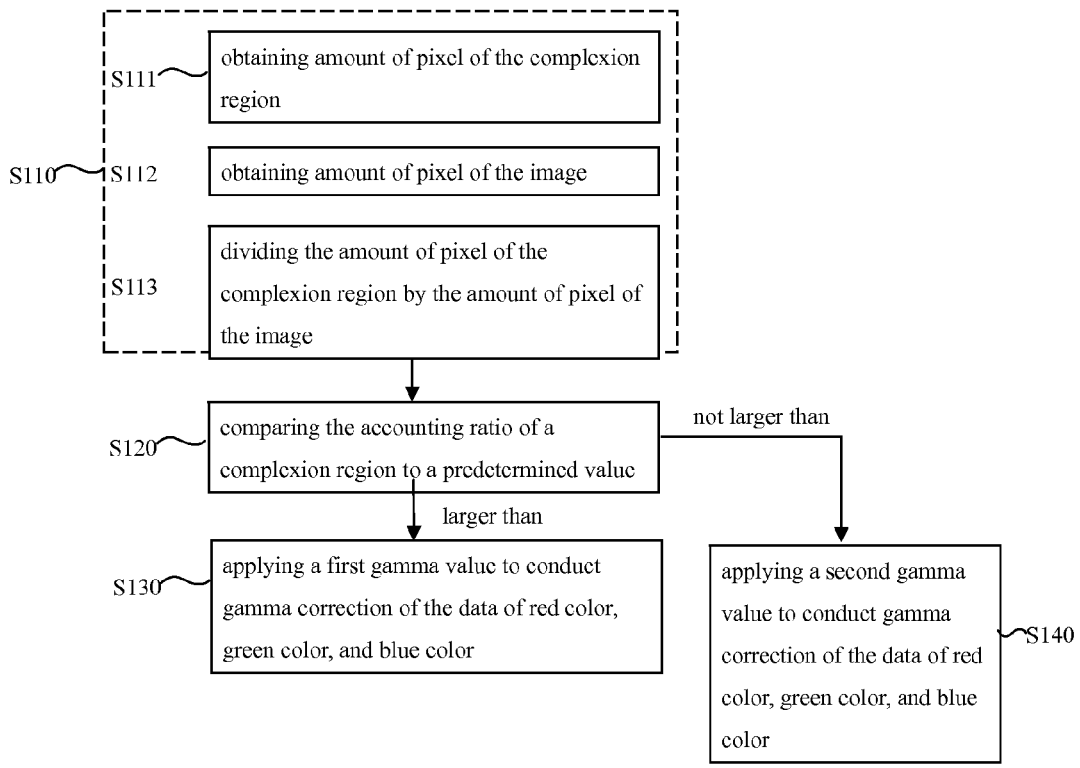
FIG. 1 is a flow chart of a method of correcting complexion color shift of LCD in accordance with an embodiment of the present invention.

FIG. 1 is a flow chart of a method of correcting complexion color shift of LCD. Referring to FIG. 1, the method of correcting complexion color shift of LCD includes the following steps.

In step S110, the LCD receives the input data of red color (R), green color (G), and blue color (B) and obtains accounting ratio of a complexion region of an image which will be shown in the LCD according to the input data of RGB. The data of red color includes but not limited to the grayscale of red color. The data of green color includes but not limited to the grayscale of green color. The data of blue color includes but not limited to the grayscale of blue color.

In the step S110, a method of obtaining the accounting ratio of the complexion region includes the following steps.

In step S111, the LCD obtains amount of pixel of the complexion region according to the input data of RGB. The LCD can obtain the amount of pixel of the complexion region by adopting a method of optimizing the complexion taught in China Patent No. CN201310177454.1. The present invention is, however, not limited to the method of optimizing the complexion.

In step S112, the LCD obtains amount of pixel of an image which will be shown in the LCD according to the input data of RGB.

In step S113, the LCD divides the amount of pixel of the complexion region by the amount of pixel of the image to obtain the accounting ratio of the complexion region.

In step 120, the LCD compares the accounting ratio of the complexion region to a predetermined value, wherein the range of the predetermined value is 0.1~0.2.

Step 130 is conducted as the accounting ratio of the complexion region is larger than the predetermined value. Step 140 is conducted as the accounting ratio of the complexion region is not larger than the predetermined value.

In the step 130, the LCD applies a first gamma value to conduct gamma correction of the data of red color, green color, and blue color if the accounting ratio is larger than the predetermined value; wherein the first gamma value is larger than 2.2. Preferably, the first gamma value is larger than 2.4.

In the step 140, the LCD applies a second gamma value to conduct gamma correction of the data of red color, green color, and blue color if the accounting ratio is larger than the predetermined value; wherein the second gamma value is less than the first gamma value. Preferably, the second gamma value is 2.2.

Figure 2:
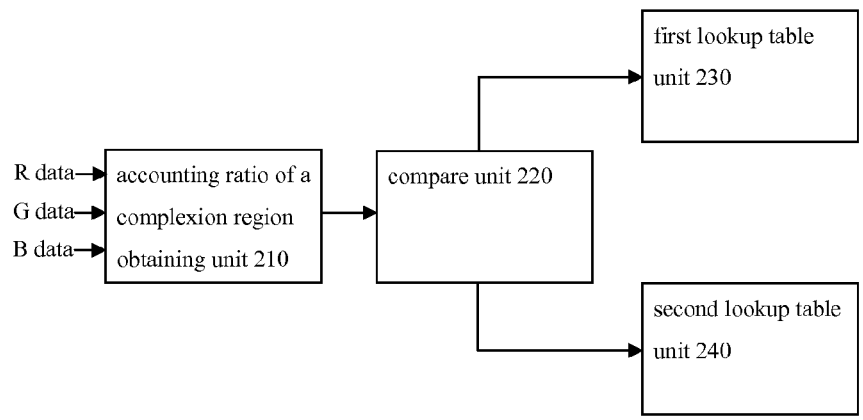
FIG. 2 is a block diagram of a system of correcting complexion color shift of LCD in accordance with an embodiment of the present invention.

FIG. 2 is a block diagram of a system of correcting complexion color shift of LCD. Referring to FIG. 2, the system of correcting complexion color shift of LCD includes an accounting ratio of a complexion region obtaining unit 210; a compare unit 220; a first lookup table unit 230; and a second lookup table unit 240. The first lookup table unit 230 and the second lookup table unit 240 can be set internally in a timing controller (not shown), but the present invention is not limited to the above structure. In another embodiment, the system can include other and/or different units. Similarly, the function of the above units can be combined in a single component.

The accounting ratio of a complexion region obtaining unit 210 receives the input data of red color (R), green color (G), and blue color (B) and obtains accounting ratio of a complexion region of an image which will be shown in the LCD according to the input data of RGB. The data of red color includes but not limited to the grayscale of red color. The data of green color includes but not limited to the grayscale of green color. The data of blue color includes but not limited to the grayscale of blue color.

Figure 3:
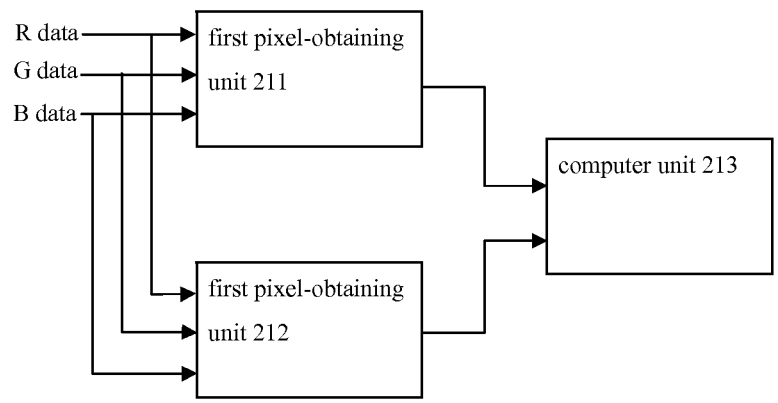
FIG. 3 is an internal configuration diagram of an accounting ratio of a complexion region obtaining unit in accordance with an embodiment of the present invention.

An internal configuration diagram of the accounting ratio of a complexion region obtaining unit in accordance with an embodiment of the present invention is shown in FIG. 3. Referring to FIG. 3, the accounting ratio of a complexion region obtaining unit 210 includes a first pixel-obtaining unit 211; a second pixel-obtaining unit 212; and a computer unit 213.

The first pixel-obtaining unit 211 receives the input data of RGB and obtains amount of pixel of the complexion region of the image which will be shown in the LCD according to the input data of RGB. The first pixel-obtaining unit 211 can obtain the amount of pixel of the complexion region by adopting a method of optimizing the complexion taught in China Patent No. CN201310177454.1. The present invention is, however, not limited to the method of optimizing the complexion.

The second pixel-obtaining unit 212 obtains amount of pixel of the complexion region of the image which will be shown in the LCD according to the input data of RGB.

The computer unit 213 obtains accounting ratio of the complexion region of the image which will be shown in the LCD by dividing the amount of pixel of the complexion region by the amount of pixel of the image.

The compare unit 220 compares the accounting ratio of the complexion region to a predetermined value, wherein the range of the predetermined value is 0.1~0.2.

After comparison, the first lookup table unit 230 can apply a first gamma value to conduct gamma correction of the data of red color, green color, and blue color if the accounting ratio is larger than the predetermined value; wherein the first gamma value is larger than 2.2. Preferably, the first gamma value is larger than 2.4.

After comparison, the second lookup table unit 240 can apply a second gamma value to conduct gamma correction of the data of red color, green color, and blue color if the accounting ratio is not larger than the predetermined value; wherein the second gamma value is less than the first gamma value. Preferably, the second gamma value is 2.2.

In summary, the gamma value conducting gamma correction of data of red color, green color, and blue color of the image which will be shown in the LCD is increased as the accounting ratio of a complexion region of the image larger than the predetermined value, based on the input data of RGB, is confirmed, according to the method of correcting complexion color shift of LCD and the system thereof in accordance with the embodiments of the present invention. That is, the gamma value of the image of front viewing angle of the LCD is increased. Accordingly, the gamma value of the image of big viewing angle approaches the curve of gamma value 2.2 more in the LCD and wash out of the complexion of the image of the big viewing angle is eliminated.

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

What is claimed is:

1. A method of correcting complexion color shift of LCD, comprising:
    receiving an image by the LCD;
    obtaining accounting ratio of a complexion region of the image from the LCD by using an accounting ratio of a complexion region obtaining unit;
    receiving the accounting ratio of the complexion region from the accounting ratio of a complexion region obtaining unit and comparing the accounting ratio of the complexion region to a predetermined value by a compare unit;
    applying a first gamma value to conduct gamma correction of the data of red color, green color, and blue color if the accounting ratio of the complexion region is larger than the predetermined value; and receiving the data being gamma corrected and displaying the data being gamma corrected on the LCD;

wherein the first gamma value is larger than 2.4, and a range of the predetermined value is 0.1~0.2.

2. The method of claim 1, further comprising:

applying a second gamma value to conduct gamma correction of the data of red color, green color, and blue color if the accounting ratio of the complexion region is not larger than the predetermined value; wherein the second gamma value is less than the first gamma value.

3. The method of claim 2, wherein the method of obtaining the accounting ratio of the complexion region comprising:

obtaining amount of pixel of the complexion region;

obtaining amount of pixel of the image; and dividing the amount of pixel of the complexion region by the amount of pixel of the image.

4. The method of claim 1, wherein the method of obtaining the accounting ratio of the complexion region comprising:

obtaining amount of pixel of the complexion region;

obtaining amount of pixel of the image; and dividing the amount of pixel of the complexion region by the amount of pixel of the image.

\* \* \* \* \*